United States Patent [19]

Brannon

[11] Patent Number: 5,262,236
[45] Date of Patent: Nov. 16, 1993

[54] GLASS SIZE COMPOSITIONS AND GLASS FIBERS COATED THEREWITH

[75] Inventor: Robert C. Brannon, Newark, Ohio

[73] Assignee: Owens-Corning Fiberglas Technology Inc., Summit, Ill.

[21] Appl. No.: 764,574

[22] Filed: Sep. 19, 1991

[51] Int. Cl.$^5$ ............................................. D02G 3/00
[52] U.S. Cl. .................................. 428/378; 428/375; 428/391; 428/405; 525/168; 525/170; 525/447; 525/448; 525/277; 523/209
[58] Field of Search ................. 428/391, 378, 375; 524/47; 523/503, 504, 209; 525/168, 170, 447, 448; 522/27, 39, 40

[56] References Cited
FOREIGN PATENT DOCUMENTS
119057 6/1985 Romania .

*Primary Examiner*—Patrick J. Ryan
*Assistant Examiner*—Richard P. Weisberger
*Attorney, Agent, or Firm*—Ted C. Gillespie; Patrick P. Pacella; Charles H. Ellerbrock

[57] ABSTRACT

Aqueous size compositions for glass fibers including a film former, coupling agent and crystalline pentaerythritol, which are particularly suitable glass fiber reinforcements for filament winding and pultrusion.

10 Claims, No Drawings ical field

This invention relates to a size composition and to glass fibers at least partially coated therewith which are useful for reinforcing plastics. One of many reinforcements is roving for filament wound pipe.

BACKGROUND ART

A key property of rovings is the degree to which they filamentize or separate. One tailors some rovings to stay together and others to separate or break up. In filament winding pipe and pultrusion, the industry wants the roving to separate for better wet-out of the resin.

DISCLOSURE OF THE INVENTION

This invention is an epoxy-compatible, filament winding size. The size uses crystalline pentaerythritol, which is 2,2-bis (hydroxmethyl), -1,3-propanediol with the chemical structure $C(CH_2OH)_4$. Pentaerythritol is insoluble and forms crystals on the surface of the glass fibers during the forming operation. These crystals aid in the filamentization of a group of strands when used under tension.

DESCRIPTION OF THE PREFERRED EMBODIMENTS

The glass size composition of the present invention is useful with filamentous glass which is well known to those skilled in the art. Various types of glass filaments, such as "E" glass and other known types of glass, can be sized with the size of the present invention. The size of the present invention is useful on glass filaments having a wide range of diameters and can be used on glass filaments whether or not they are gathered into fibers, ropes, rovings, yarns and the like.

This size covers the use of a pentaerythritol which is slightly soluble in water at room temperature. During the forming process, the pentaerythritol falls out of solution and crystals are formed on the surface of the fibers. These crystals act to separate the fibers during wet-out and allow resin to penetrate the glass fiber bundle. The sizing contains a film former and coupling agent that acts along with the pentaerythritol to improve wet-out of the filament. We have found that small amounts of the pentaerythritol (greater than trace and 0.50 weight percent or less) greatly improves the cycle to weep performance of sizes for filament wound pipe.

Preferably, the size of this invention comprises by weight percent:

|  | Weight Percent |
| --- | --- |
| film former | 1–10 |
| coupling agent | 0.2–1.5 |
| crystalline pentaerythritol | .05–.50 |
| polyalkylene glycol | .05–2.0 |
| lubricant | .05–1.5 |
| acid | to a pH of less than 5 |
| water | balance |

The film-forming polymer component of the aqueous sizing composition can be any suitable polymer which can be dispersed or dissolved in aqueous medium and which will coalesce to form a film when the sizing composition which has been applied to the glass fiber is dried. To achieve the most satisfactory reinforcing effects, the film-forming polymer component should be selected additionally for compatibility with the matrix resin in which the sized glass fibers will be embedded as reinforcing elements. Thus, for the sizing of glass fiber to be used as reinforcement for epoxy resins or vinyl esters of epoxy resins, epoxy resins are particularly suitable as the film-forming polymer component of the aqueous sizing composition of the invention. Epoxy resins are also suitable as the film-forming polymer in sizing compositions for glass fiber for reinforcing other curable matrix resins such as unsaturated polyester resins, but other film-forming polymers as suitable unsaturated polyesters, particularly for glass fibers for reinforcing unsaturated polyester matrix resin, can also be employed as the film-forming polymer of the sizing composition.

Where an epoxy resin is employed as the film-forming polymer in the aqueous sizing composition of the invention, diglycidyl ethers of substantially linear epichlorohydrin-bisphenol A condensates are particularly suitable, especially where the matrix resin in which the sized glass fibers are to be embedded as reinforcement comprises a vinyl ester of an epoxy resin. Such epoxy resins can advantageously be admixed with minor proportions of a solvent such as diacetone alcohol and/or xylene and this mixture dispersed in the aqueous medium of the sizing composition using a non-ionic surfactant such as a polyalkylene glycol.

The lubricant component of the aqueous sizing composition of this invention can be any normally liquid or solid lubricating material suitable for the purpose. Such materials include vegetable and mineral oils, waxes of various types and certain materials which also have utility as surfactants, such as fatty acid monoesters of polyalkyleneglycols. In the context of the present invention, it has been found advantageous to employ a normally liquid lubricant material as at least part of the lubricant component of the sizing composition. It has been found particularly advantageous to employ as the normally liquid portion of the lubricant an isostearate monoester of a polyethyleneglycol, and, if a normally solid lubricant material is to be used therewith, to employ a normally solid stearate monoester of a polyethyleneglycol.

The coupling agent component of the aqueous sizing composition of the invention comprises organosilanes, having a readily hydrolyzable bond to a silicon atom of the silane, or hydrolysis products thereof. The organosilanes may have an epoxy, i.e., oxirane, group linked through non-hydrolyzable bonds to a silicon atom. The organo-silane also may have an acrylyl or methacrylyl group linked through non-hydrolyzable bonds to a silicon atom of the silane; preferably the acrylyl or methacrylyl group is a acrylyloxy or methacrylyloxy group. The organo-silanes include monosilanes containing the structure $Si(OR)_2$, where the R's can be virtually any organic group, but lower alkyl groups such as methyl or ethyl are particularly convenient and satisfactory. An example of the organo-silane is a glycidoxy polymethylenetrialkoxysilane, such as 3-glycidoxy-1-propyltrimethoxysilane. Another example is an acryloxy or methacrylyloxypolymethylenetrialkoxylsilane such as 3-methacrylyloxy-1-propyltrimethoxysilane. I prefer an organo-silane such as gammaglycidoxypropyltrimethoxysilane available as A-187 from Union Carbide. Other suitable coupling agents include gamma-methacryloxypropyltrimethoxysilane, available as A-174 from Union Carbide, diaminopropyltrimethoxysilane, and gamma-aminopropyltriethoxysilane available as A-1100 from Union Carbide.

The addition of an acid to the size is primarily for pH control. The amount of acid employed is sufficient to impart to the size a pH of less than 5%. However, the quantity of acid may be increased to impart to the size a pH within the range of from about 3 to about 4, and preferably to a pH of about 3.7.

More preferably the size of this invention comprises by weight percent:

|  | Weight Percent |
|---|---|
| film former | 6–10 |
| coupling agent | 0.5–1.0 |
| crystalline pentaerythritol | 0.1–0.3 |
| polyalkylene glycol | 0.5–1.5 |
| lubricant | 0.5–1.0 |
| acid | to a pH of less than 4 |
| water | Balance |

The total solids content will preferably be from about 1 to about 25% and more preferably from about 3 to about 10%, by weight.

The aqueous sizing composition can be applied to the glass fibers drawing the fibers over a roll, pad, or other suitable surface wet or flooded with the aqueous sizing composition, by spraying, by dipping, or by any other suitable means. The overall concentration of the non-volatile components in the aqueous sizing composition can be adjusted over a wide range according to the means of application to be employed, the character of the glass fibers to be sized, e.g. their diameter and composition, and the weiqht of dried size coating desired for the intended use of the sized fibers. Preferably, the sized fibers will have a loading of about 0.25 to about 1.0 percent by weight of dried size.

The sized glass fibers of the invention can be incorporated into the curable matrix resin which is to be reinforced thereby in the final cured resinous article as either monofilament or multi-filament strand, the latter being more usual and preferred, and as either long, essentially continuous, elements or short chopped pieces, depending upon the shape and method of fabrication of the article to be formed. The sized glass fibers of this invention are particularly adapted for use in the form of long, essentially continuous, multi-filament strand in reinforcing cured resinous articles such as pipes or tanks fabricated by filament winding, whereby the sized glass fibers are embedded in the liquid matrix resin by winding them about a suitable form while simultaneously applying the liquid matrix resin to that form, as by loading the glass fiber strand therewith as it approaches the winding form upon which the article is being constructed. The matrix resin is subsequently cured to provide the final reinforced resinous article. The sized glass fibers of the invention in the form of long multi-filament strand are also particularly adapted for use in reinforcing cured resinous articles formed by so-called pultrusion processes, wherein the strand of sized fibers is drawn through a zone where it is immersed in the liquid matrix resin and then pulled through a shaping die whereby excess liquid resin is removed and the remaining resin having the glass fiber strand embedded therein is shaped into the desired cross-sectional form and then cured.

EXAMPLE I

A preferred aqueous sizing composition has the following formulation:

|  | Weight Percent |
|---|---|
| Epoxy resin AD 502* from Owens-Corning Fiberglas | 8.7 |
| Organo-silane A-187 from Union Carbide | 0.8 |
| Crystalline pentaerythritol having a melting point of 260° C. | 0.12 |
| Polyethylene glycol monostearate PEG- 400 M.O. from Ethox Chemicals | 1.4 |
| Polyethyleneimine Emery 6760u | 0.9 |
| Citric acid | 0.04 |
| Water | balance |

*The epoxy resin is a diglycidyl ether of an epichlorohydrin/bisphenol A condensate and has an epoxy equivalent weight of about 250.

The size was applied to E-glass fibers using a roll-type applicator, following which the fibers were grouped together into a strand and the strand was wrapped upon a revolving mandrel to produce a package. The package was placed in an oven heated to 265° F., and was dried for 24 hours. Four strands were grouped together to form a bundle that was used to produce filament wound pipe by passing the strands through a resin bath comprising a solution containing 100 parts by weight of Dow Chemical Co. DER 331 epoxy resin and 26.2 parts by weight of 4,4-Methylenedianiline curing agent and thereafter bringing the coated strands together to form the bundle.

EXAMPLE II

The coated strand was pulled through the guide eyes of the filament winding apparatus and was then wound upon a mandrel at a helix angle of 54° to provide a pipe having an inside diameter of 2.235 inches and a wall thickness of 0.065 inches. The resulting filament wound material was cured at 350° F. for 1 hour. The pipe had a fiber loading of 66% and was tested according to ASTM Spec. D-2143.

This cycle to weep test measures the number of pressure cycles between 0 and 1200 psi (and additionally 1500 psi) before electrical conductivity is established through the pipe. The conductivity or weeping of filament wound pipe indicates fatigue or failure between the laminating resin and the reinforcing glass fibers. A regression line is drawn for the cyclic data at different test pressures. A predicted cycles-to-weep value is calculated at a pipe hoop stress of 19,000 psi. 10,000 cycles is considered very good.

The coated glass fibers of this invention achieved 31,000 cycles-to-weep.

The above data show that glass sized with the size of the present invention compare very favorably against industry standards.

It will be evident from the foregoing that various modifications can be made to the present invention. Such, however, are considered as being within the scope of the invention.

I claim:

1. An aqueous size composition for glass fibers comprising a film former, coupling agent and crystalline pentaerythritol.

2. An aqueous size composition for glass fibers comprising a film former, coupling agent, crystalline pentaerythritol, lubricant and an acid.

3. An aqueous size composition for glass fibers comprising an epoxy resin, organo silane, crystalline pentaerythritol, polyalkylene glycol, lubricant and an acid.

4. An aqueous size composition for glass fibers comprising an epoxy resin of diglycidyl ethers of substantially linear epichlorohydrin-bisphenol A condensates, organo silanes having lower alkyl groups, crystalline pentaerythritol, polyethylene glycol, lubricant and acid.

5. An aqueous size composition for glass fibers comprising:
   an epoxy resin of diglycidyl ether of epichlorohydrin-bisphenol A condensate having an epoxy equivalent weight of about 250;
   gamma-glycidoxypropyl trimethoxysilane;
   crystalline pentaerythritol having a melting point of 260° C.;
   polyethylene glycol monostearate;
   polyethyleneimine;
   citric acid.

6. A size composition according to claim 2 comprising by weight percent:

|  | Weight Percent |
| --- | --- |
| film former | 1–10 |
| coupling agent | 0.2–1.5 |
| crystalline pentaerythritol | .05–.50 |
| polyalkylene glycol | .05–2.0 |
| lubricant | .05–1.5 |
| acid | to a pH of less than 5 |
| water | balance |

7. A size composition according to claim 2 comprising by weight percent:

|  | Weight Percent |
| --- | --- |
| film former | 6–10 |
| coupling agent | 0.5–1.0 |
| crystalline pentaerythritol | 0.1–0.3 |
| polyalkylene glycol | 0.5–1.5 |
| lubricant | 0.5–1.0 |
| acid | to a pH of less than 4 |
| water | Balance |

8. A size composition according to claim 3 comprising by weight percent:

|  | Weight Percent |
| --- | --- |
| epoxy resin | 8.7 |
| organo-silane | 0.8 |
| crystalline pentaerythritol | 0.12 |
| polyalkylene glycol | 1.4 |
| lubricant | 0.9 |
| acid | 0.04 |
| water | balance |

9. A glass fiber having a size coating comprising the dried residue of the aqueous composition of claim 1.

10. A glass fiber having a size coating comprising the dried residue of the aqueous composition of claim 5.

* * * * *